Jan. 19, 1965
R. L. BRISON ETAL
3,166,277
VEHICLE WORK PLATFORM
Filed July 19, 1963
3 Sheets-Sheet 1
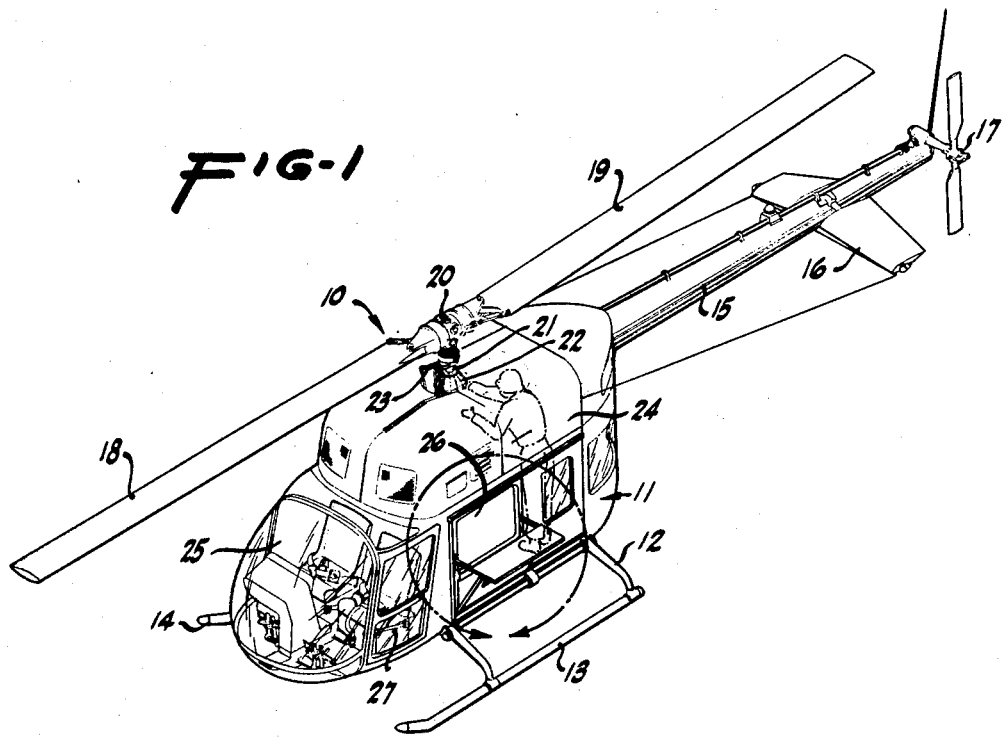
FIG-1
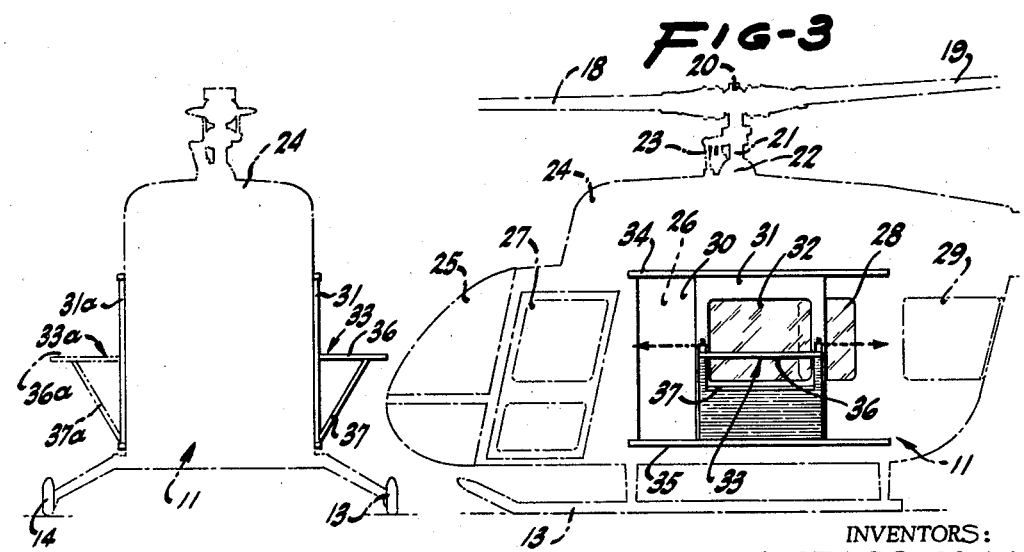
FIG-2
FIG-3
INVENTORS:
ROBERT L. BRISON &
BY EDWARD H. JACOBSEN
Bielos & Schlemmer
attorneys

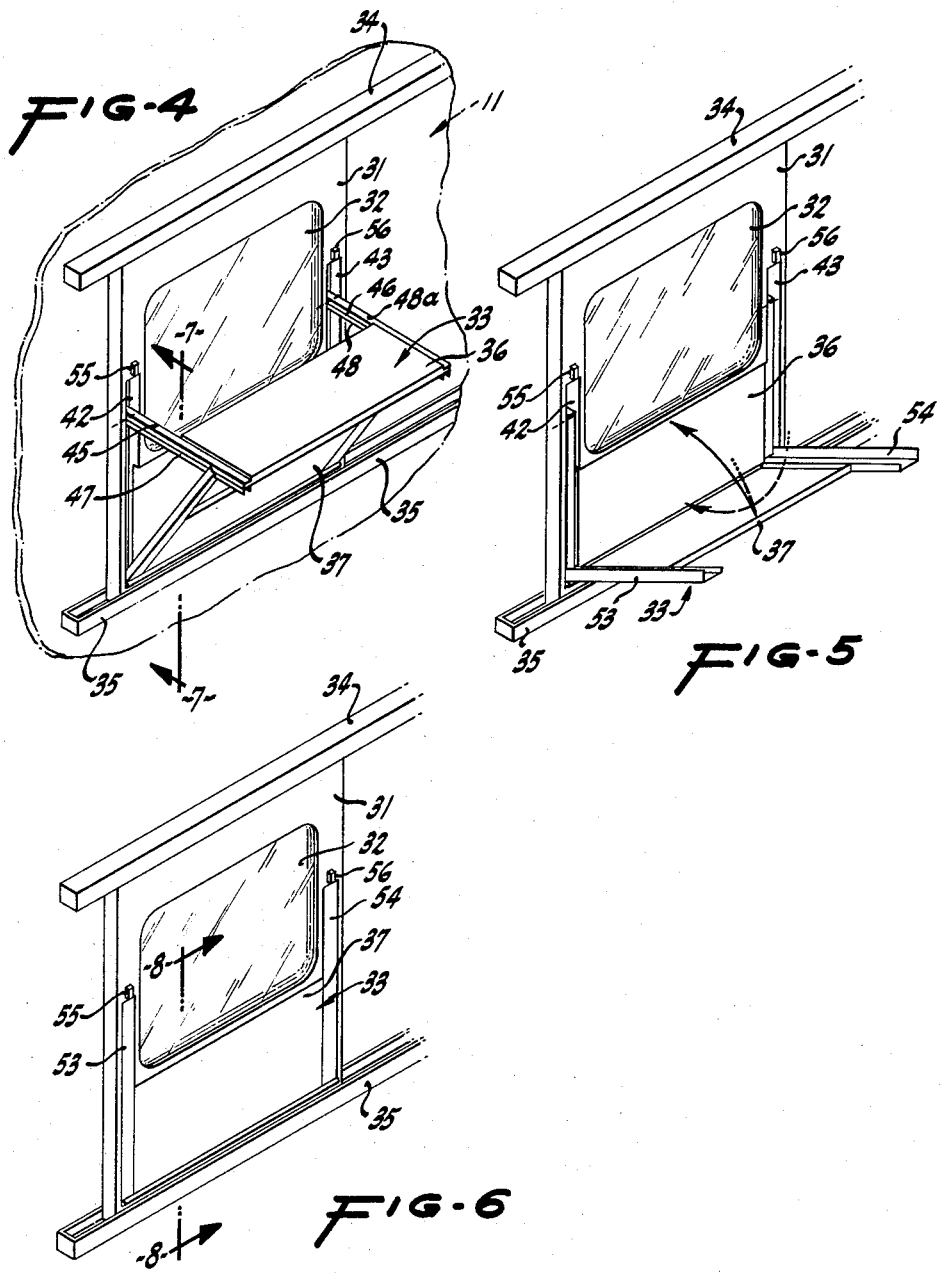

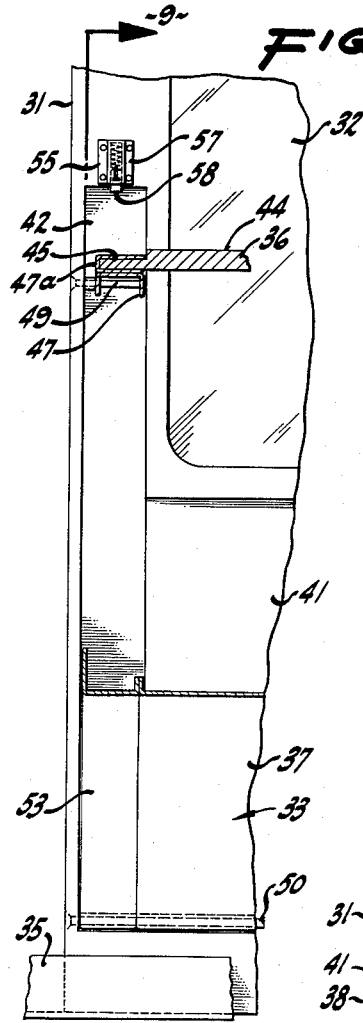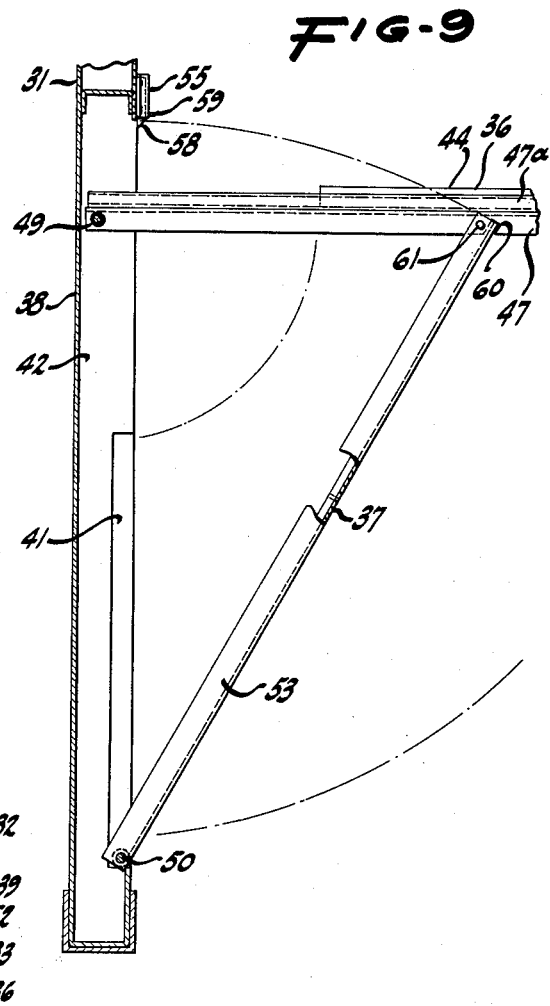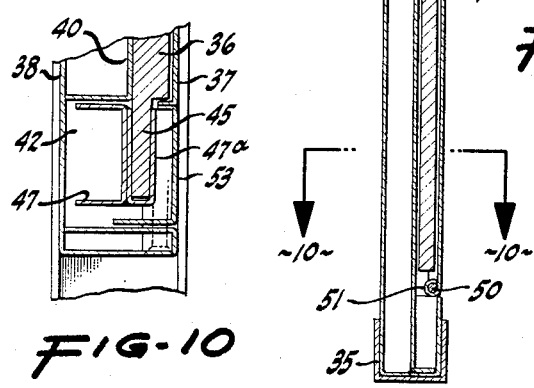

United States Patent Office 3,166,277
Patented Jan. 19, 1965

3,166,277
VEHICLE WORK PLATFORM
Robert L. Brison, Mountain View, and Edward H. Jacobsen, Menlo Park, Calif., assignors, by mesne assignments, to Hiller Aircraft Company, Inc., Menlo Park, Calif., a corporation of Delaware
Filed July 19, 1963, Ser. No. 296,310
10 Claims. (Cl. 244—129)

This invention relates to vehicles and, in particular, to aircraft such as helicopters and the like; and it relates more especially to a work platform for such vehicles.

Considering a helicopter as an exemplary environment for the invention, such aircraft typically comprises a fuselage providing therein an enclosure frequently sectioned to define both a pilot's compartment and a passenger or cargo-carrying compartment. Located above the fuselage is a rotor assembly that includes a plurality of rotor blades or lift wings secured to a hub rotatably driven by an engine through a rotor column. Such rotor blades are connected to control mechanism by means of which both cyclic and collective pitch adjustments are made; and a substantial part of such mechanism is located above the fuselage. It is also quite customary, especially in modern helicopters, to locate the engine either above or in the upper portions of such fuselage; and quite evidently then, a significant portion of the power and control assemblies for the aircraft are oriented and disposed generally above the aircraft fuselage and, consequently, cannot be serviced by a workman standing upon the ground.

The fuselage of a typical helicopter is relatively small, and a substantial portion, if not the major portion, of the side walls thereof is occupied by windows and doors, which leaves little surface area available for use as steps or supports for personnel servicing those components of the helicopter that are inaccessible when standing on the ground. Therefore, it is usual to employ ladders, special maintenance platforms and other similar equipment to gain access to such working components for servicing the same.

In view of the foregoing, an object of the present invention is to equip a helicopter or like aircraft with a work platform that can be selectively moved into an extended position for use and a retracted position when not in use as, for example, during flight of the aircraft.

Another object of the invention is in the provision of a selectively extensible and retractible work platform for helicopters and the like, which is adapted to support the the weight of one or more workmen thereon, is located at an elevation such that the components of the helicopter disposed above and in the upper portion of the fuselage are within convenient reach of such workman, and which is movable along the fuselage to enable the workman to position the platform at a location most convenient for his servicing operations.

Still another object is that of providing a helicopter having a door movable longitudinally along the fuselage thereof between open and closed positions, with a work platform carried by such door for longitudinal movements therewith; such platform being selectively foldable between an extended position of use and a retracted position when not in use.

A further object is to provide a helicopter, a door therefor and work platform all of the character described, and in which such work platform in the retracted position thereof forms a part of such door and establishes a relatively smooth, substantially uninterrupted outer surface area thereof.

Additional objects and advantages of the invention will become apparent as the specification develops.

An exemplary embodiment of the invention is illustrated in the accompanying drawings, in which—

FIGURE 1 is a perspective view of a helicopter embodying the invention;

FIGURE 2 is a diagrammatic front view in elevation of the helicopter shown in FIGURE 1, the work platform on the port side thereof being shown in its extended position, and the work platform on the starboard side thereof being in its retracted position (its extended position being illustrated by broken lines);

FIGURE 3 is a side view in elevation of a helicopter door and work platform, the helicopter associated therewith being illustrated by broken lines to show the relationship of such door thereto;

FIGURE 4 is a broken perspective view of the door and work platform in relation to the side wall of the helicopter fuselage, the work platform being shown in its extended position;

FIGURE 5 is a perspective view of the door and work platform and is generally similar to FIGURE 4 except that the work platform is partially retracted;

FIGURE 6 is a perspective view corresponding to that of FIGURE 5, except that the work platform is completely retracted;

FIGURE 7 is an enlarged, broken vertical sectional view of the door and work platform taken generally along the line 7—7 of FIGURE 4;

FIGURE 8 is an enlarged, broken vertical sectional view taken generally along the line 8—8 of FIGURE 6 and showing a portion of the interconnecting elements of the work platform;

FIGURE 9 is an enlarged, broken vertical sectional view taken along the line 9—9 of FIGURE 7; and FIGURE 10 is an enlarged, broken transverse sectional view taken along the line 10—10 of FIGURE 8.

The helicopter illustrated in FIGURE 1 is designated in its entirety with the numeral 10, and includes a fuselage 11 equipped with a landing gear 12 having ground-engaging skids 13 and 14, a tail boom 15, stabilizers 16 and a tail rotor assembly 17 (both of which are carried by the tail boom), and a pair of rotor blades or lift wings 18 and 19 secured to a rotor hub 20 rotatably driven through a rotor column 21 and transmission 22. The cyclic and collective pitch adjustments of the rotor blades 18 and 19 are effected through control linkages or mechanisms 23, and the prime mover or engine, as well as a number of components necessarily associated therewith, are carried upon a flight deck provided by the fuselage 11 along its upper portion and are concealed, as shown in FIGURE 1, by a removable cowling 24. The fuselage 11 defines therein a compartment or enclosure that is sectioned into a pilot's compartment 25 and a passenger or cargo-carrying compartment 26; and access to the pilot's compartment 25 is afforded through conventional door structure 27. With respect to the helicopter as thus far described, it may be taken to be substantially conventional.

The passenger compartment 26 is provided with a plurality of windows 28 and 29 and with a large access opening or doorway 30 on each side thereof. Each opening 30 is provided with a door or closure member 31 slidable movable longitudinally along the fuselage 11 between open and closed positions. The door 31 is equipped with a relatively large window 32 and provides a support structure for a work platform designated generally with the numeral 33. For purposes of distinguishing between the doors and work platforms respectively provided on the port and starboard sides of the aircraft, as shown in FIGURE 2, the suffix "a" has been added to such components on the starboard side.

The door 31 may be supported by the fuselage for longitudinal displacements therealong by any suitable means as, for example, by the upper and lower tracks 34 and 35 which are shown most clearly in FIGURES 4 through 6. Such channels or tracks 34 and 35 may be of U-shaped cross section, as shown, and are disposed with respect to each other so that the open sides thereof are in facing relation, whereupon the upper and lower edge portions of the door 31 are receivable within such channels and are longitudinally slidable along the lengths thereof. The channels may be closed at each end so as to define stops or abutments which positively confine the door for movement therebetween and respectively establish the fully closed and fully open positions thereof. Ordinarily, latch means (not shown since the same may be of wholly conventional type) will be included in association with the door to lock it in at least the closed position thereof.

The work platform 33 includes two main components or sections—the first being a step or workman-supporting section 36, and the other being a brace or support section 37. The sections 36 and 37 of the work platform 33 are selectively movable between a retracted position (as shown in FIGURE 6) and an extended position of use (as shown in FIGURE 4); and in such latter position, the section 36 is horizontally disposed and is adapted to receive and support a workman thereon, as illustrated in FIGURE 1. The section 36 is maintained in its horizontal position of use by the brace or support section 37 which inclines upwardly and outwardly from the lower edge portion of the door 31 and engages the section 36 intermediate the inner and outer ends thereof.

As shown most clearly in FIGURES 7 and 8, the door 31 has inner and outer walls or panels 38 and 39—the latter of which is inwardly offset throughout its lower portion (as shown at 40) so as to form a large housing portion in the form of recess 41 adapted to receive the platform sections 36 and 37 therein, as seen best in FIGURES 6 and 8. Along the transverse edge portions thereof, the recess 41 is vertically elongated as indicated at 42 in FIGURE 7 and at 42 and 43 in FIGURES 4 and 5; and such edge portions may be of slightly greater depth than the main body of the recess, as is most clearly indicated in FIGURE 10. The panels 38 and 39 are welded or otherwise secured to each other, and the door may be suitably braced to provide a strong, substantially rigid structure. The door can be constructed along conventional lines and fabricated in accordance with well known techniques so long as it has sufficient strength to provide a mounting for the work platform 33 of a character adequate to support the weight of a workman standing thereon.

The platform section 36 is essentially planar from end to end thereof in order to provide a surface 44 appropriate for receiving a workman thereon. Adjacent each of its transverse edges, the section 36 is stepped downwardly and provides offset arms 45 and 46 that extend inwardly beyond the inner longitudinal edge of the central workman-receiving surface 44. Respectively underlying the arms 45 and 46 and rigidly secured thereto are channels 47 and 48 that may be of U-shaped cross section, as shown most clearly in FIGURES 7 and 10, and serve to reinforce and strengthen the arms. For the purpose of further reinforcing the arms 45 and 46 of the platform section 36, such arms may have a channel extending thereabout and secured to the underlying reinforcing channel, as shown in FIGURES 7 and 10—such additional channel being denoted for identification with the numeral 47a (48a in FIGURE 4). The section 36 is supported by the door 31 for swinging movements between the extended and retracted positions respectively illustrated in FIGURES 4 and 5; and in the specific form shown, such swinging movement occurs about an axis defined by a pair of pins— one of which is shown in FIGURES 7 and 9 and is denoted with the numeral 49. The pin 49 pivotally extends through the flanges of the channel 47 and is suitably supported within the extension 42 of the recess 41, as shown in FIGURE 7, by appropriate structural elements of the door 31. The channel 48 is similarly supported for pivotal movement within the extension 43 of the recess 41.

The section 37 is hingedly supported by the door 31 for swinging movements between the extended and retracted positions respectively illustrated in FIGURES 4, 9 and 6, 8; and in its extended position, it engages the section 36 to support the same in the generally horizontal position of use thereof. Such swinging movement of the section 37 occurs about an axis defined by an elongated pin 50 extending through a generally tubular lower edge portion 51 of the section which is formed by rolling such lower edge portion into such tubular configuration, as shown best in FIGURE 8. Also as shown in such figure, the upper edge of the section 37 may have an inwardly turned lip 52 extending into the recess 41 when the sections 36 and 37 are retracted.

The section 37 is equipped along the transverse edges thereof with arms or struts 53 and 54 that extend beyond the longitudinal edge portion defined by the lip 52 so as to nest within the extensions 42 and 43 of the recess 41 when the section 37 is retracted. The struts 53 and 54 (as shown best in FIGURES 7 and 10), may be channel-shaped elements welded or otherwise rigidly secured to the central, generally planar portion of the section 37. The struts 53 and 54 are arranged with respect to the extensions 42 and 43 of the recess 41 and also with respect to the arm-channel structures 45–47 and 46–48 so that the section 37 can be fully retracted to form a flush or coextensive surface with the door 31, as shown in FIGURE 6.

The work platform 33 may be secured in the retracted position thereof by any suitable and convenient fastener means, as exemplified by the fastener structures 55 and 56 respectively associated with the struts 53 and 54. The illustrative fasteners 55 and 56 are conventional and, as shown best in FIGURE 7, each includes a stationary element 57 welded or riveted to the door panel 39; and each such stationary element has a channel therein slidably receiving a pin 58 spring biased downwardly so as to overlie an upper edge portion of the respectively associated struts 53 and 54 when the work platform is in its retracted position. The pin 58 is equipped with a lug 59 extending through an elongated opening in the fixed element 57, and such lug may be gripped to slide the pin upwardly against the biasing force of the spring bearing thereagainst to draw the pin into the fixed element 57 and thereby permit the platform section 37 to be moved either into or out of the fully retracted position thereof.

The sections 36 and 37 of the work platform are interconnected in the extended position of use thereof in a manner such that the section 36 is fixedly but releasably supported by the section 37. In the specific structure illustrated, such interconnection is provided by an inclined slot 60 formed in the webs of each of the channels 47 and 48 comprised by the section 36 of the work platform; and such slots respectively receive therein the outer end portions of the respectively associated struts 53 and 54, as shown most clearly in FIGURE 9. A locking pin 61 may be inserted through aligned openings provided by at least certain of the flanges of the strut 53 and channel 47 (and by the strut 54 and channel 48 to receive a similar pin) to prevent inadvertent separation of the platform sections 36 and 37 while in their extended, interconnected condition.

Ordinarily, each of the work platforms 33 and 33a is retracted into the respectively associated doors 31 and 31a (as shown in FIGURE 6 and as indicated in full lines on the starboard side of the aircraft shown in FIGURE 2). Each of the work platforms is secured within such retracted position by latch structures 55 and 56 which prevent the work platforms from being extended except by specific intent. In their retracted positions, the work platforms (and in particular the sections 37 thereof) form a part of the outer surface of the associated doors so that such surfaces are substantially planar and are relatively free from obstructions and other irregularities. The doors are freely manipulatable with the work platforms retracted and function in a conventional manner, just as if the work platforms did not comprise a part thereof, and are longitudinally displaceable relative to the fuselage 11 between open and closed positions.

When it is desired to use either or both of the work platforms, the latches 55 and 56 associated therewith are released to permit the platform section 37 to be swung outwardly about the hinge support thereof defined by the pin 50, as indicated in FIGURE 5. If desired, a handle, finger grip or other arrangement (spring means located in either or both of the extensions 42 and 43, for example) may be employed to facilitate outward swinging movement of the platform section 37 upon release of the fastener structures 55 and 56. After the section 37 has been swung outwardly into the approximate position thereof shown in FIGURE 5, the platform section 36 is swung outwardly about the axis defined by the pins 49; and the section is then swung upwardly to an elevation such that the platform section 37 may be moved inwardly therebeneath to align the upper end portions of the struts 53 and 54 with the respectively associated slots 60 in the channels 47 and 48. The section 36 is then moved downwardly to establish a firm interconnection between the two platform sections, and the pins 61 may be inserted to fix the platform sections in such extended position thereof.

In their extended position, the work platforms are adapted to receive one or more workmen thereon, as shown in FIGURE 1, and they are disposed at an elevation that permits such workmen to conveniently reach the aircraft components located along and above the upper portion of the fuselage. The doors 31 and 31a are still moveable longitudinally relative to the fuselage 11—which has the effect of extending the length of the work platform in that a workman is able to position the door at a location such that the components of the aircraft that he must service are within convenient reach. Thus, the door may be located in its fully closed position, in its fully open position, or at any suitable intermediate position. The doors may be suitably braced in any position selected therefor so as to prevent unwanted movement when the workman is standing upon the platform; and in this same respect, the door may be provided with latch means operative to releasably but automatically anchor the door in any selected position thereof such as, for example, the door latch assembly disclosed in the copending patent application of Moises Salmun, Serial No. 201,660, filed June 11, 1962, now Patent No. 3,131,892.

In retracting the work platform, the sections 36 and 37 thereof are manipulated in a reverse manner, and after the pins 61 have been withdrawn the platform section 36 is swung upwardly to withdraw the struts 53 and 54 from their respectively associated slots 60. Subsequent thereto, the platform section 37 is pivoted downwardly and outwardly (as shown by the arrow in FIGURE 5), the platform section 36 is swung inwardly and into the recess 41, and the platform section 37 is then pivoted inwardly and upwardly and into the recess (as shown in FIGURE 8), at which time the latch structures 55 and 56 engage the upper edges of the struts 53 and 54 to retain the work platform in its retracted position.

While in the foregoing specification an embodiment of the invention has been set forth in considerable detail for purposes of making an adequate disclosure thereof, it will be apparent to those skilled in the art that numerous changes may be made in such details without departing from the spirit and principles of the invention.

What is claimed is:

1. In combination with an aircraft having a fuselage provided with an upwardly extending wall structure and having also along the upper portion of said fuselage components that require servicing, a support structure carried by said wall structure intermediate the upper and lower edges thereof for longitudinal displacement therealong, a work platform carried by said support structure and being selectively movable between an extended position of use in which a workman standing thereon is within reach of at least certain of said components and a retracted position of storage, said work platform thereby being movable relative to said fuselage generally along the longitudinal axis thereof to provide convenient access to a greater number of components along the upper portion of said fuselage, and means for releasably securing said platform in both the extended and retracted positions thereof.

2. The combination with a rotary wing aircraft having a compartment-defining fuselage provided with an access opening therefor and being equipped with rotor assembly components located above said fuselage, of a door carried by said fuselage for longitudinal displacements therealong between positions respectively closing and uncovering said access opening, a work platform carried by said door whereby said work platform is displaceable therewith relative to said fuselage generally along the longitudinal axis thereof and being selectively movable between an extended position of use in which a workman standing thereon is within reach of at least certain of said components and a retracted position of storage, and means for releasably securing said platform in both the extended and retracted positions thereof.

3. The combination of claim 2 in which said means includes latch structure for securing said work platform in the retracted position thereof.

4. The combination with a rotary wing aircraft having a compartment-defining fuselage provided with an access opening therefor and being equipped with rotor assembly components located above said fuselage, of a door carried by said fuselage for longitudinal displacements therealong between positions respectively closing and uncovering said access opening, a work platform carried by said door whereby said work platform is displaceable therewith relative to said fuselage generally along the longitudinal axis thereof and being selectively movable between an extended position of use in which a workman standing thereon is within reach of at least certain of said components and a retracted position of storage, said work platform comprising a pair of sections each pivotally secured to said door for swinging movement between such extended and retracted positions, one of said sections being generally horizontally disposed in the extended position of use thereof for receiving such workman thereon and the other of said sections in its extended position of use being a support for the aforementioned section to maintain the same in such horizontal position thereof, fastener structure for releasably interconnecting said sections in their extended position of use, and latch structure for releasably securing said sections in their retracted position.

5. The combination with a rotary wing aircraft having a compartment-defining fuselage provided with an access opening therefor and being equipped with rotor assembly components located above said fuselage, of a door carried by said fuselage for longitudinal displacements therealong between positions respectively closing and uncovering said access opening, a work platform carried by said door whereby said work platform is displaceable therewith relative to said fuselage generally along the longitudinal axis thereof, said door being provided with a relatively large recess formed in the outer wall thereof and said work platform being selectively movable between an extended position of use in which a workman standing thereon is within reach of at least certain of said components and a retracted position of storage in which it nests within said recess and substantially forms a continuation of the outer wall thereof, said work platform comprising a pair of sections each pivotally secured to said door for swinging movement between such extended and retracted positions, one of said sections being generally horizontally disposed in the extended position of use thereof for receiving such workman thereon and the other of said sections in its extended position of use being a support for the aforementioned section to maintain the same in such horizontal position thereof, fastener structure for releasably interconnecting said sections in their extended position of use, and latch structure for releasably securing said sections in their retracted position.

6. The combination of claim 5 in which said recess is upwardly elongated along each of the transverse edge portions thereof, and in which the aforementioned one section is equipped along the transverse edges thereof with elongated arms respectively aligned with said elongated edge portions of said recess and are receivable therein, said arms being pivotally secured to said door within said elongated edge portions of said recess.

7. The combination of claim 6 in which the other of said sections is equipped along the transverse edges thereof with elongated struts respectively alignable with the elongated edge portions of said recess for receipt therein and being engageable with the arms of said one section to support the same in the extended position of use thereof.

8. The combination of claim 7 in which the aforementioned other section overlies the aforesaid one section in nesting relation within said recess in the retracted position of said work platform.

9. The combination with a rotary wing aircraft having a fuselage with a compartment therein and an access opening therefor and being equipped with rotor assembly components above said fuselage of a door carried by said fuselage for slidable movement longitudinally therealong between positions respectively closing and uncovering said access opening, a work platform carried by said door whereby said work platform is movable therewith, said door being provided with a housing formed in the outer wall thereof for receiving said platform and said platform being selectively movable between an extended position of use in which a workman standing thereon is within reach of at least certain of said components and a retracted position of storage in which it nests within said housing and substantially forms a continuation of the outer wall of said door, and means for releasably securing said platform in both the extended and retracted positions thereof.

10. The combination with a rotary wing aircraft having a compartment-defining fuselage provided with an access opening therefor and being equipped with rotor assembly components above said fuselage, of a door carried by said fuselage for slidable movement longitudinally therealong between positions respectively closing and uncovering said access opening, said door having a relatively large window in the upper portion thereof and a recess beneath said window in the outer wall of said door, a work platform carried by said door whereby said work platform is movable therewith relative to said fuselage generally along the longitudinal axis thereof, said work platform being selectively movable between an extended position of use in which a workman standing thereon is within reach of at least certain of said components and a retracted position of storage in which it nests within said recess and substantially forms a continuation of the outer wall thereof.

References Cited in the file of this patent

UNITED STATES PATENTS

| 2,097,991 | Sikorsky | Nov. 2, 1937 |
| 2,188,338 | Diehl | Jan. 30, 1940 |
| 2,581,488 | Keltner et al. | Jan. 8, 1952 |
| 2,989,273 | Grunfelder | June 20, 1961 |
| 3,050,275 | Kottssieper | Aug. 21, 1962 |

FOREIGN PATENTS

| 356,160 | Germany | July 14, 1922 |